(12) United States Patent
Schneider

(10) Patent No.: US 9,522,565 B2
(45) Date of Patent: Dec. 20, 2016

(54) TEMPORARY OUTDOOR GRAPHIC FILM

(71) Applicant: Avery Dennison Corporation, Pasadena, CA (US)

(72) Inventor: Robert W. Schneider, Chardon, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 13/688,696

(22) Filed: Nov. 29, 2012

(65) Prior Publication Data

US 2013/0089704 A1 Apr. 11, 2013

Related U.S. Application Data

(62) Division of application No. 12/477,995, filed on Jun. 4, 2009, now Pat. No. 8,349,437.

(60) Provisional application No. 61/059,369, filed on Jun. 6, 2008.

(51) Int. Cl.
| | | |
|---|---|---|
| *B32B 33/00* | (2006.01) | |
| *B32B 7/12* | (2006.01) | |
| *C09J 7/02* | (2006.01) | |
| *G02B 5/12* | (2006.01) | |
| *B44C 1/16* | (2006.01) | |

(Continued)

(52) U.S. Cl.
CPC ............... *B44C 1/162* (2013.01); *B32B 7/12* (2013.01); *B44C 1/1712* (2013.01); *B44C 1/1733* (2013.01); *C09J 7/0257* (2013.01); *E01F 9/512* (2016.02); *G02B 5/12* (2013.01); *G02B 5/128* (2013.01); *C09J 2401/006* (2013.01); *Y10T 428/1476* (2015.01); *Y10T 428/2443* (2015.01); *Y10T 428/24331* (2015.01); *Y10T 428/24355* (2015.01); *Y10T 428/24364* (2015.01); *Y10T 428/24554* (2015.01); *Y10T 428/24802* (2015.01); *Y10T 428/24851* (2015.01); *Y10T 428/28* (2015.01)

(58) Field of Classification Search
USPC ..... 428/138, 150, 141, 204, 195.1, 201, 343
See application file for complete search history.

(56) References Cited

U.S. PATENT DOCUMENTS

| | | | |
|---|---|---|---|
| 3,802,952 A | | 4/1974 | Gurin et al. |
| 3,915,771 A | * | 10/1975 | Gatzke et al. .......... 156/71 |
| 3,932,191 A | | 1/1976 | Jerabek et al. |

(Continued)

FOREIGN PATENT DOCUMENTS

| | | |
|---|---|---|
| GB | 1077761 | 8/1967 |
| GB | 1401088 | 7/1975 |

(Continued)

OTHER PUBLICATIONS

International Search Report and Written Opinion issued in corresponding IA No. PCT/US2009/046194 dated Dec. 1, 2009.

(Continued)

*Primary Examiner* — Lorna Douyon
(74) *Attorney, Agent, or Firm* — Avery Dennison Corporation

(57) ABSTRACT

Temporary graphic films that may be applied to rough, outdoor surfaces such as concrete or asphalt pavement are provided. The temporary graphic films are durable, yet easily removed and may include a fracturable material that permits fluid flow to reduce slip and fall situations.

9 Claims, 7 Drawing Sheets

(51) Int. Cl.
*G02B 5/128* (2006.01)
*B44C 1/17* (2006.01)

(56) References Cited

U.S. PATENT DOCUMENTS

| | | | |
|---|---|---|---|
| 5,104,719 A | 4/1992 | Kamen et al. | |
| 5,164,444 A * | 11/1992 | Bernard | C08F 220/18 522/153 |
| 5,229,201 A | 7/1993 | Blanco | |
| 5,397,634 A | 3/1995 | Cahill et al. | |
| 5,407,666 A | 4/1995 | Patel et al. | |
| 5,411,351 A * | 5/1995 | Lasch et al. | 404/14 |
| 5,509,969 A | 4/1996 | Grawe | |
| 5,536,569 A * | 7/1996 | Lasch et al. | 428/328 |
| 5,681,660 A | 10/1997 | Bull et al. | |
| 5,689,636 A | 11/1997 | Kleber et al. | |
| 5,720,804 A | 2/1998 | Martin | |
| 5,789,067 A | 8/1998 | Mizumachi et al. | |
| 5,904,976 A | 5/1999 | Berry et al. | |
| 5,916,861 A | 6/1999 | Lyssy | |
| 5,972,095 A | 10/1999 | Graves et al. | |
| 5,985,951 A | 11/1999 | Cook | |
| 6,054,208 A | 4/2000 | Rega et al. | |
| 6,180,228 B1 | 1/2001 | Mueller et al. | |
| 6,254,878 B1 | 7/2001 | Bednarek et al. | |
| 6,254,970 B1 | 7/2001 | Hiatt et al. | |
| 6,354,029 B1 | 3/2002 | Chenel | |
| 6,428,814 B1 | 8/2002 | Bosch et al. | |
| 6,455,140 B1 | 9/2002 | Whitney et al. | |
| 6,479,142 B1 | 11/2002 | Condon et al. | |
| 6,511,547 B1 | 1/2003 | Sahbari | |
| 6,548,164 B1 * | 4/2003 | Bacon, Jr. | 428/343 |
| 6,641,270 B2 * | 11/2003 | Hannington et al. | 359/536 |
| 6,770,360 B2 | 8/2004 | Mientus et al. | |
| 6,783,829 B2 | 8/2004 | Arena | |
| 6,793,859 B2 | 9/2004 | Emslander et al. | |
| 6,830,803 B2 | 12/2004 | Vaidya et al. | |
| 6,847,737 B1 | 1/2005 | Kouri et al. | |
| 6,991,851 B2 | 1/2006 | Krepski et al. | |
| 7,291,233 B2 | 11/2007 | Brigato et al. | |
| 2001/0039316 A1 | 11/2001 | Campbell et al. | |
| 2002/0139392 A1 | 10/2002 | Cervero et al. | |
| 2003/0068436 A1 * | 4/2003 | Fleming et al. | 427/255.6 |
| 2003/0070579 A1 * | 4/2003 | Hong et al. | 106/31.04 |
| 2003/0123931 A1 * | 7/2003 | Khieu et al. | 404/12 |
| 2003/0215593 A1 | 11/2003 | Morgan et al. | |
| 2004/0025907 A1 | 2/2004 | Tadych et al. | |
| 2004/0043221 A1 | 3/2004 | Bharti et al. | |
| 2004/0175407 A1 | 9/2004 | McDaniel | |
| 2004/0200568 A1 | 10/2004 | Rhein et al. | |
| 2005/0019359 A1 | 1/2005 | Amato et al. | |
| 2005/0026799 A1 | 2/2005 | Detar et al. | |
| 2005/0153091 A1 | 7/2005 | Challoner et al. | |
| 2005/0221042 A1 * | 10/2005 | Chirhart et al. | 428/40.1 |
| 2006/0003114 A1 | 1/2006 | Enlow et al. | |
| 2006/0019068 A1 | 1/2006 | Hannington | |
| 2006/0020079 A1 | 1/2006 | Lorenzo et al. | |
| 2006/0089281 A1 | 4/2006 | Gibson | |
| 2006/0222831 A1 | 10/2006 | Sloan | |
| 2006/0251688 A1 | 11/2006 | Gajanan et al. | |
| 2007/0054998 A1 | 3/2007 | Harashina | |
| 2007/0095003 A1 | 5/2007 | Hei et al. | |
| 2007/0107636 A1 * | 5/2007 | Warren | 106/499 |
| 2007/0110966 A1 | 5/2007 | Warren | |
| 2008/0003406 A1 | 1/2008 | Steelman | |
| 2008/0135163 A1 | 6/2008 | Farmer | |
| 2008/0206583 A1 | 8/2008 | Phan et al. | |
| 2008/0264559 A1 * | 10/2008 | Akhtar et al. | 156/277 |
| 2008/0268140 A1 | 10/2008 | Akhtar et al. | |

FOREIGN PATENT DOCUMENTS

| | | |
|---|---|---|
| JP | 04-223158 | 8/1992 |
| JP | 06-128916 | 5/1994 |
| JP | 2000-140797 | 5/2000 |
| JP | 2001-115112 | 4/2001 |
| JP | 2003-313349 | 11/2003 |
| JP | 2006-063552 | 3/2006 |
| JP | 2010-353102 | 11/2010 |

OTHER PUBLICATIONS

"Thousandth of an inch—Wikipedia, the Free Encyclopedia," Aug. 27, 2014, http://en.wikipedia.org/wiki/Thousandth_of_an_inch, retrieved Nov. 18, 2014.

* cited by examiner

TEMPORARY OUTDOOR GRAPHIC FILM

CROSS REFERENCE TO RELATED APPLICATIONS

The present application is a division of U.S. patent application Ser. No. 12/477,995 filed Jun. 4, 2009, now U.S. Pat. No. 8,349,437, which claims the benefit of U.S. Provisional Patent Application No. 61/059,369 filed on Jun. 6, 2008 the contents of which are hereby incorporated by reference in their entirety.

FIELD OF THE INVENTION

This invention relates to graphic films. More specifically, the invention relates to temporary graphic films that may be applied to outdoor or indoor surfaces (horizontal, vertical or angled) such as concrete, asphalt pavement, walkways, walls as well as ceramic tile, textured flooring and the like. The temporary graphic films are durable, yet easily removed.

BACKGROUND OF THE INVENTION

Large-sized, custom printed sheets are used in a wide range of applications, including advertising. Digital printers, including digital offset and wide-format inkjet printers, screen printers with UV and solvent based inks allow end-users to custom print large sized graphics onto sheets "on demand". After printing, users can apply a printed large-sized sheet to a wall or window and then remove the sheet within a relatively short period of time, typically from about one day to about 3 months and in some cases even longer.

Temporary graphic films have been produced using adhesive backed vinyl films. While such films are useful for application to vertical surfaces, they are not practical for application to horizontal surfaces where foot traffic or vehicle traffic must pass over the vinyl film which may quickly wear down or abrade the images. The edges of the vinyl films are easily peeled up from the substrate surface creating a trip hazard and the smooth surface of the vinyl film can create a slip hazard to both pedestrians and vehicle drivers. In addition, vinyl films in general are not highly conformable so they do not adhere well to irregular surfaces such as concrete and asphalt pavement. Moreover, such films are not impervious to fluids which may be spilled on a surface or moisture that may be created by humidity or other weather conditions creating a slippery surface and a potential hazard.

An alternative method of applying graphics to a horizontal surface is to paint the surface. However, it is difficult if not impossible to achieve a durable, yet easily removable graphic image with paint. In addition, it is difficult to create complex graphics or features of an image, which can limit the impact of a particular image or message to be conveyed. Water washable paints do not provide the required durability to withstand foot or vehicle traffic or weather conditions for even relatively short periods of time. Paints specifically designed for exterior use are not easily removed and are therefore not appropriate for use as temporary graphics.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to a removable graphic that can be applied to horizontal, vertical and angled surfaces regardless of whether the surface is smooth or has readily discernable tactile elements. The graphic film described herein is also fracturable such that liquids can drain from the surface, much like if the surface was in its original state thereby mitigating the potential hazard of having a slippery surface.

In one exemplary embodiment of the present invention, there is provided a temporary removable graphic film assembly comprising: a printable polymeric layer having a first surface and a second surface and having a thickness of less than about 10 mils, and preferably less than about 3 mils. The printable film comprises a blend of materials that are used to generate a brittle or fracturable film when coated on a surface. An exemplary formulation may include cellulose acetate butyrate and sucrose acetate isobutyrate.

Continuing with a description of the presently described embodiment, a layer of pressure sensitive adhesive is provided having a first surface and a second surface, the first surface of the adhesive layer is adhered to the second surface of the polymeric layer. The graphic film assembly is fracturable and conformable to surfaces having a roughness average, Ra, of at least 25 microns. The temporary graphic film assembly may include a print layer on the first surface or the second surface of the printable layer. The printable layer may be transparent or opaque.

The present invention is further directed to a method of making a temporary removable graphic film assembly, the method comprising: mixing a blend of cellulose acetate butyrate and sucrose acetate isobutyrate in at least one polar solvent to form a coating composition and then applying the coating composition to a removable backing. Next, the coating composition is dried to form a printable polymeric layer. An adhesive layer is applied to the surface of the polymeric layer opposite the backing and printed graphics are applied to the printable polymeric layer.

In one aspect of the invention there is provided a decorated substrate composite comprising: a substrate comprising at least one surface having a roughness average Ra of at least 25 microns; and a temporary removable graphic assembly adhered to the substrate, the assembly comprising (a) a printable polymeric layer having a first surface and a second surface and having a thickness of less than 3 mils, the printable film comprising a blend of cellulose acetate butyrate and sucrose acetate isobutyrate; and (b) a layer of pressure sensitive adhesive having a first surface and a second surface, the first surface of the adhesive layer adhered to the second surface of the polymeric layer; wherein the temporary removable graphic assembly is removed by applying a high pressure water jet to the graphic assembly.

In a further aspect of the invention there is provided a method of applying a temporary removable graphic assembly to the surface of a substrate, the method comprising the steps of initially providing a graphic assembly comprising (a) a printable polymeric layer having a first surface and a second surface and having a thickness of less than 3 mils. The printable film includes a blend of cellulose acetate butyrate and sucrose acetate isobutyrate; (b) a layer of pressure sensitive adhesive having a first surface and a second surface, the first surface of the adhesive layer adhered to the second surface of the polymeric layer; and (c)

a layer of graphics printed on the first or second surface of the printable polymeric layer. Next, the graphic assembly is positioned over the surface of the substrate, wherein the surface contains a plurality of protrusions having edges and has a roughness average Ra of at least 25 microns. Pressure is applied to the first surface of the printable polymeric layer to conform the graphic assembly to the surface of the substrate. A plurality of fractures—adjacent surface areas disposed horizontally to one another causing a plurality of fractures to be formed in the graphic assembly. —can be formed in the graphic assembly corresponding to the edges of the protrusions of the substrate surface. A benefit of this invention is the ability to apply graphics to variably textured surfaces, that is, the film may be applied to rough, uneven surfaces causing the film to look as if it has fractures or cracks within it. Therefore a plurality of fractures can be formed in the graphic assembly when applied to rough surfaces. In other words, the face film cracks resulting in a plurality of fractures and conforms to the aggregate surface after application allowing fluid flow, e.g. moisture to move through the substrate so as not to be a trip, fall or slip hazard.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
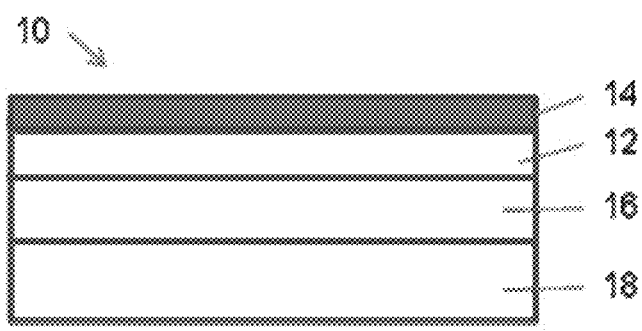
FIG. 1 is a cross-sectional view of an embodiment of the graphic article of the present invention wherein the film is printed on its outer surface.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

The graphic film assembly of the invention provides a temporary outdoor or indoor image media for use in short term promotional or advertising campaigns and special events. The graphic film assembly is particularly useful for application to walkways, walls, parking spaces, building surfaces, inclined or angled surfaces, roadways and other rough surfaces where durability and easy removal are desired.

The graphic film is thin and highly conformable to the surface irregularities of a rough surface. For example, the graphic film can be applied to concrete or asphalt pavement, cinderblock, stucco, sandstone, or any surface that may have tactile elements including flooring materials and materials having a faux texture. The graphic film can also be applied to stone or ceramic tiles or pavers, which can then be moved and reassembled at a different location. The conformability of the film to the substrate creates the look of an imaged surface, much like one would see with high quality imaged or printed sheets of paper, yet enables the surface to maintain its slip resistance. Because the graphic film is thin, it does not easily peel up from the substrate surface, as conventional vinyl films have a tendency to do.

Installation is relatively easy and requires the removal of a release liner from the adhesive surface of the film assembly back, positioning of the film and then application with light pressure applied to the film on the substrate surface. The film may be applied using one or more of the following tools: squeegee, heat gun, razor knife, rivet brush, masking tape, weed burner.

The film conforms to the contours of the substrate and is fracturable, allowing the film to "wrap" around aggregates or other surface features or tactile elements that may protrude from the substrate surface. The fractures in the film further permit fluid flow, such as moisture to pass to and from the underlying substrate. The graphic film adheres to substrate surfaces preferably having a surface roughness average, Ra, within the range of about 5 to about 200 microns, or in one embodiment, within the range of about 20 to about 100 microns, or at least about 25 microns. In one embodiment, the average maximum height of the profile, Rz, of the substrate surface is within the range of about 15 to about 300 microns, or within the range or about 25 to about 200 microns, or at least about 50 microns.

The temporary removable graphic film is durable and may last up to six months under normal pedestrian traffic and up to two months under normal street traffic. Removal of the graphic film does not require the use of organic solvents or environmentally unfriendly methods. Removal of the graphic film can be accomplished with a high pressure water jet or grinding or abrading such as with stiff brushes, sweeping or sand blasting or combinations of the foregoing. Thus in drought conditions the removability of the film is uncompromised.

The graphic film constructions of the present invention comprise a thin, conformable printable film, a layer of print, and an adhesive layer. In one embodiment, as illustrated in FIG. 1, the graphic film construction 10 comprises a printable film or layer 12 having a print layer 14 printed on the outer surface of the film 12, and a pressure sensitive adhesive layer 16 adhered to the opposite (or inner) surface of the film or layer 12. A removable release liner 18 may be applied to the adhesive layer 16 to protect the adhesive layer 16. The printable film or layer 12 may be transparent or opaque. For example, the printable film or layer 12 may be pigmented white so that the printed graphics 14 on the outer surface appear more distinct when the graphic film construction has been applied to a substrate.

Figure 2:
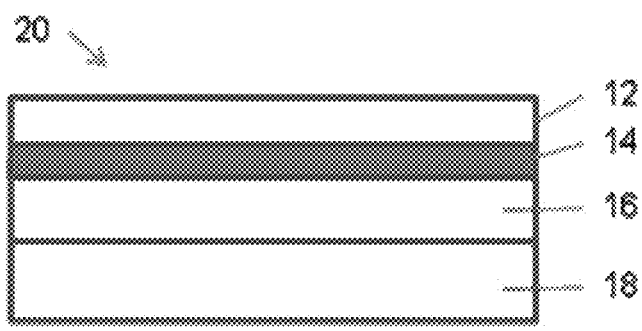
FIG. 2 is a cross-sectional view of a graphic article of another embodiment of the graphic article of the present invention wherein the film is printed on the surface adjacent the adhesive layer.

In another embodiment illustrated in FIG. 2, the graphic film construction 20 comprises a printable film or layer 12 having a layer of print 14 printed on the inner surface of the film 12, and a continuous pressure sensitive adhesive layer 16 adhered to the print layer 14. A removable release liner 18 may be applied to the adhesive layer 16 to protect the adhesive layer 16. The printable layer 12 in this embodiment is transparent. The adhesive layer 16 may be transparent or pigmented. For example, the adhesive layer 16 may be pigmented white so that the printed graphics 14 appear more distinct when the graphic film construction has been applied to a substrate.

Figure 3A:
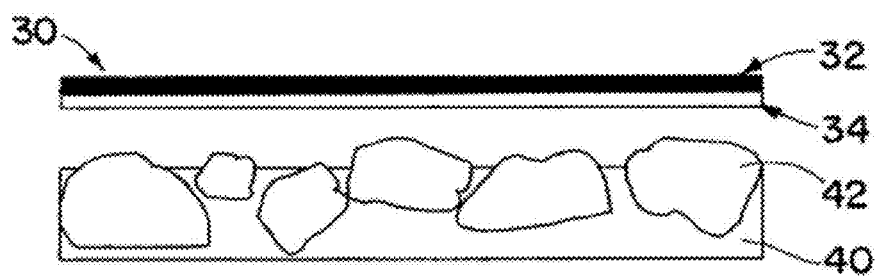
FIGS. 3A and 3B are cross-sectional views of the graphic article as applied to a textured surface.
Figure 3B:
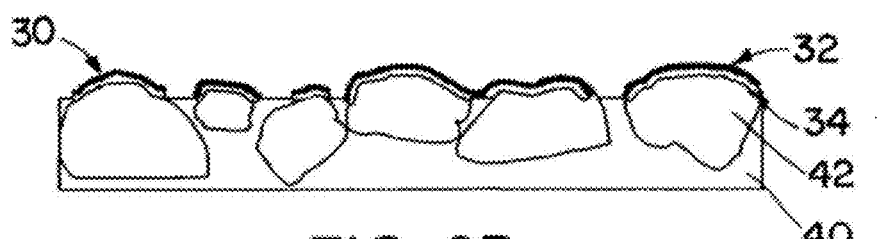

The graphic film constructions are conformable and when applied to irregular or rough surfaces of substrates, the film fractures over the contours of the irregular surface. This fracturing enables the substrate surface to maintain its slip resistance and facilitates later removal of the film. FIG. 3A illustrates an embodiment of the graphic film construction prior to application of the film to a rough surface, such as concrete or asphalt paving. The graphic film construction 30 includes a printed film 32 having an adhesive layer 34 adhered thereto. Aggregate particles 42 protrude from the surface of the base substrate 40. As illustrated in FIG. 3B, when applied to the surface of the substrate 40, the adhesive layer 34 and printed layer 32 of the film construction 30 conform to the protruding aggregate particles 34 and fracture along the edges of the particles.

Figure 4A:
FIGS. 4A and 4B are photographs showing the graphic article as applied to an asphalt surface.

FIG. 4A is a photograph showing the graphic film construction as applied to an asphalt surface. The graphic film construction conforms to the irregular surface of the asphalt and gives the appearance of a painted surface.

Figure 4B:

FIG. 4B is a photograph showing a printed film as applied to an asphalt surface. The film conforms to the surface and fractures at the roughest areas or peaks of the surface, yet the printed image remains distinct and sharp.

Figure 5:
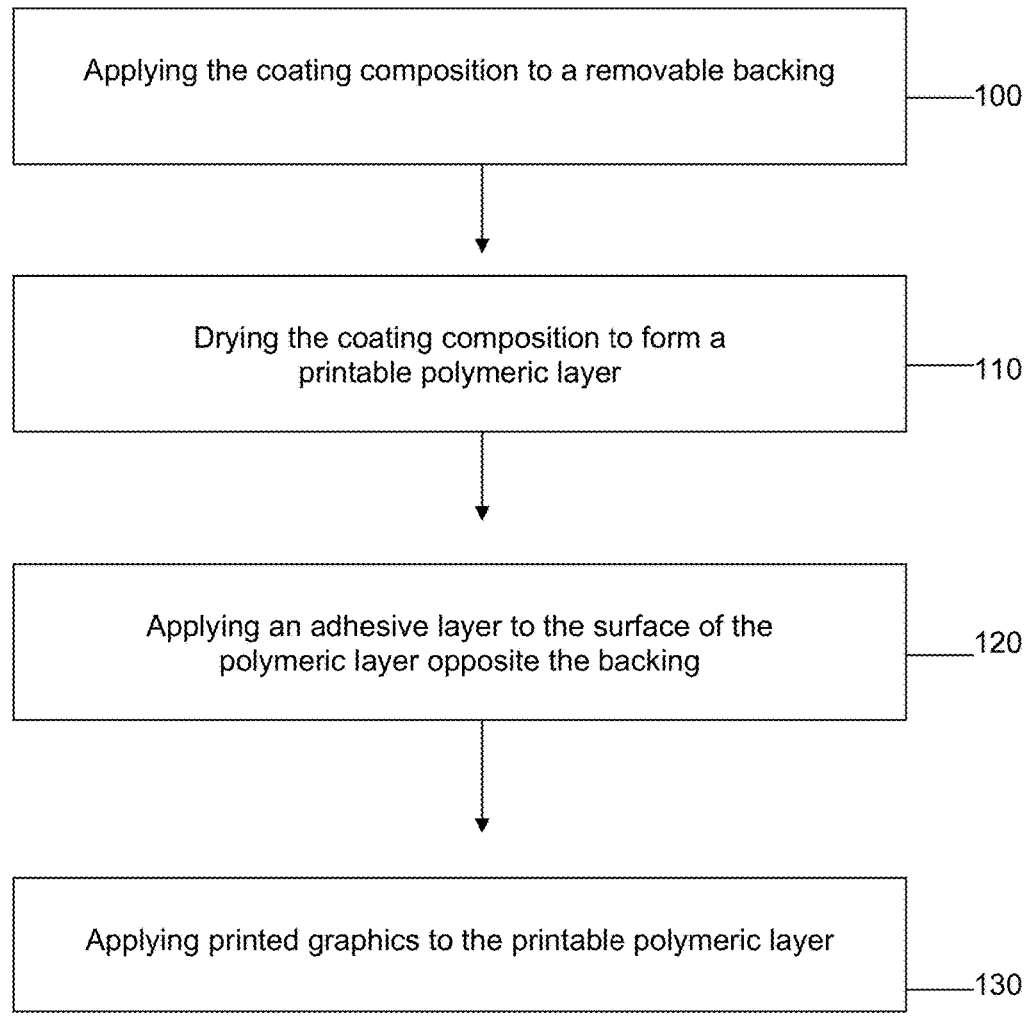
FIG. 5 is a block diagram providing a method of making a temporary removable graphic film assembly in accordance with the presently described invention.

The printable film, in one embodiment, is formed from a polymeric coating composition comprising a blend of cellulose acetate butyrate (CAB) and sucrose acetate isobutyrate. FIG. 5 exhibits the method of making a temporary graphic film assembly by mixing a blend of CAB and SAIB. After mixing the two components, a coating composition is applied to a removable backing at step 100. Then the coating composition is dried to form a printable polymeric layer at step 110. The adhesive layer is applied to the surface of the polymeric layer opposite the backing at step 120 and lastly the printed graphic is applied to the printably polymeric layer at step 130. An example of a useful CAB is CAB 553-0.4, which has a hydroxyl content of about 4.8% and is commercially available from Eastman Chemical Company. An example of a useful sucrose acetate isobutyrate is SAIB-100 commercially available from Eastman Chemical Company. The ratio of CAB to SAIB in the blend is within the range of about 7:1 to about 3:1, or within the range of about 6:1 to about 5:1. In one embodiment, the polymeric coating composition consists essentially of a blend of CAB and SAIB and pigment in a solvent. In one embodiment, the polymeric coating composition does not contain any acrylic polymers.

The CAB and SAIB may be added to one or more polar solvents to form a coating composition. Examples of suitable solvents include ethanol, methanol, n-propanol, isopropanol, n-butanol, formic acid, acetic acid, propylene glycol and diacetone alcohol.

Figure 6:
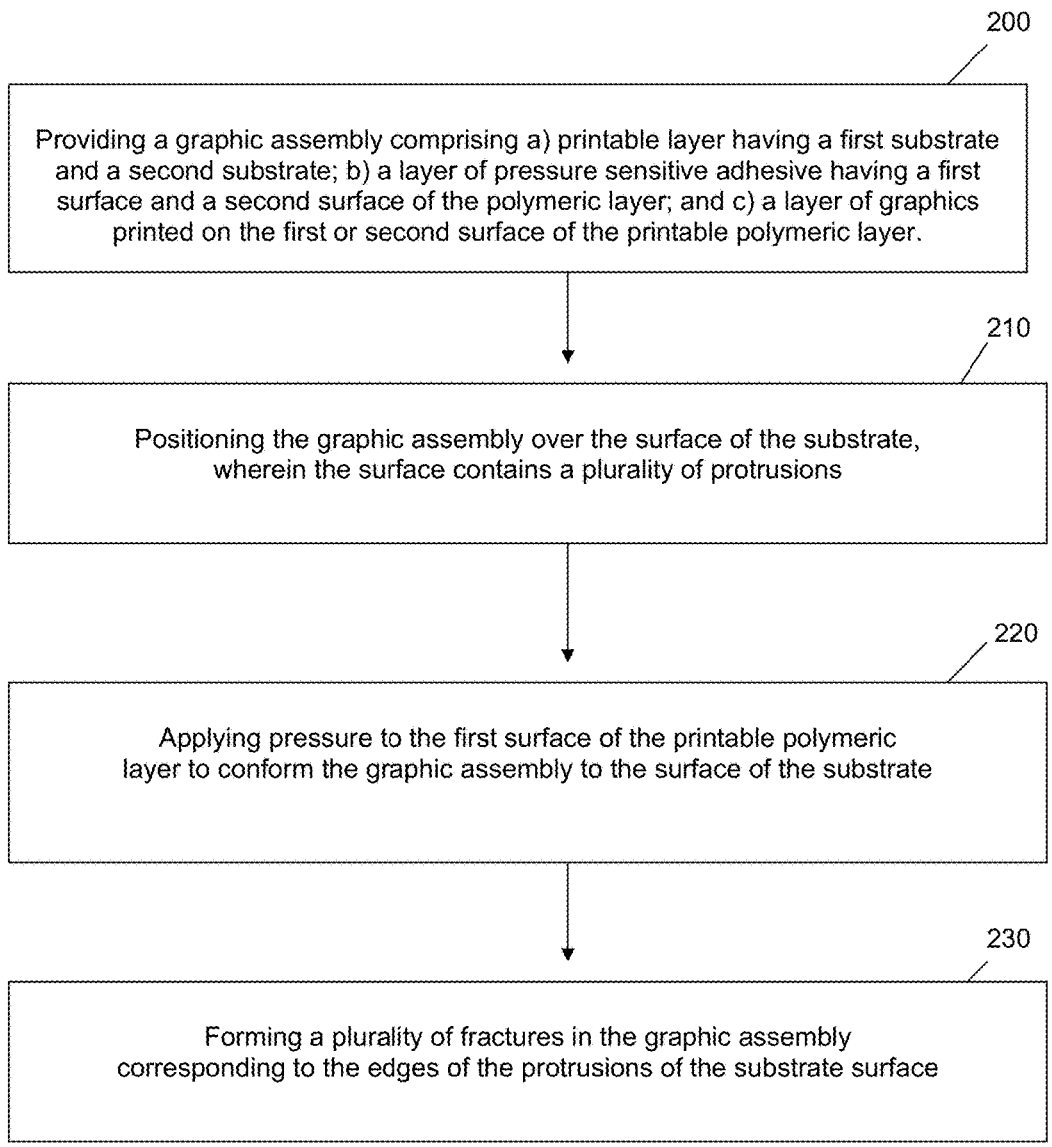
FIG. 6; is a block diagram applying a temporary removable graphic assembly to the surface of a substrate in accordance with the presently described invention.

FIG. 6. describes a method of applying a temporary removable graphic assembly to the surface of a substrate. The method comprises first, providing a graphic assembly comprising a printable polymeric layer having a first surface and a second surface and have a thickness of less than 3 ml, the printable film comprising a blend of cellulose acetate butyrate and sucrose acetate isobutyrate; a layer of pressure sensitive adhesive having a first surface and a second surface, the first surface of the adhesive layer adhered to the second surface of the polymeric layer; and a layer of graphics printed on the first or second surface of the printable polymeric layer at step 200. Secondly, the graphic assembly is positioned over the surface of the substrate, wherein the surface contains a plurality of protrusions at step 210 having edges and has a roughness average Ra of at least 25 microns, Third, applying pressure to the first surface of the printable polymeric layer to conform the graphic assembly to the surface of the substrate at step 220 and lastly forming a plurality of fractures corresponding to the edges of the protrusions of the substrate surface at step 230.

Figure 7:
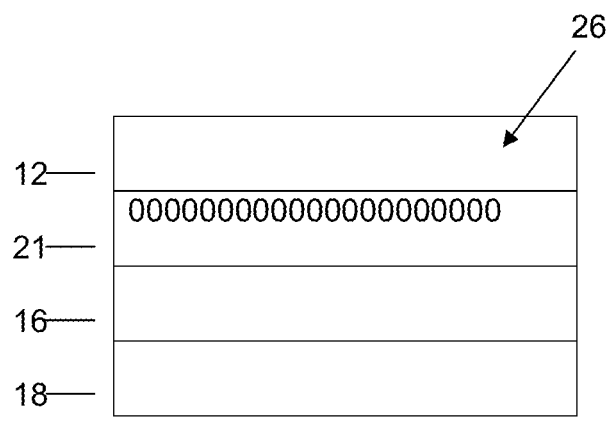
FIG. 7 is a cross-sectional view of a graphic article of another embodiment of the graphic article of the present invention wherein a reflective layer composed of retroreflective microbeads is present.
Figure 8:
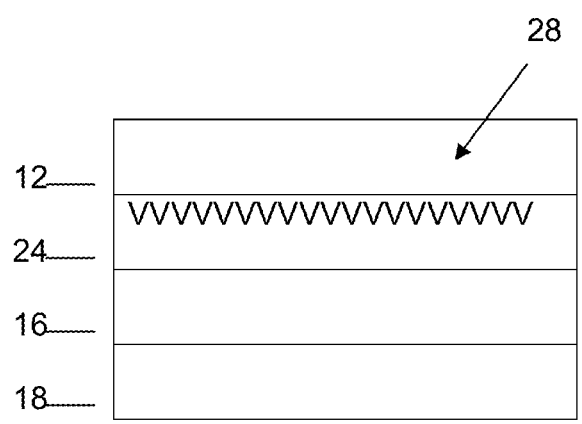
FIG. 8 is a cross-sectional view of a graphic article of another embodiment of the graphic article of the present invention wherein a reflective layer composed of a prismatic material that includes a series or array of microcubes is present.

In another embodiment illustrated by FIG. 7, the graphic film construction 26 comprises a printable layer 12 which may contain a printed image or graphic, a reflective layer comprising reflective microbeads 21, and a layer of adhesive 16 attached to a removable release liner 18. The reflective layer may also be a type of prismatic layer 24 consisting of a series or arrays of microcubes as illustrated by the graphic film construction 28 of FIG. 8. Glass beads are the most commonly used however ceramic beads such as those made by a sol/gel technique may be used as well. The refraction of retroreflective beads is generally in the range from 1.9 to 2.5, more typically in the range from 2.0 to 2.3, and most often between 2.10 and 2.25. The diameter of retroreflective beads may be characterized as having average diameters in a range from about 25 to about 300, 20 to about 120 microns, and more often in a range from about 40 to 80 microns. The reflective layer may be a component of either the adhesive layer or the printable layer as well having the effect of a gloss like appearance. Prismatic and beaded films are available from Avery Dennison Corporation, Graphic and Reflective Products Division, Painesville, Ohio. An exemplary beaded retroreflective film is shown in U.S. Pat. No. 7,264,880 and a prismatic film in RE40,700, both of which are assigned Avery Dennison Corporation the assignee of the instant application. Publications, patents and patent applications are referred to throughout this disclosure. All references cited herein are hereby incorporated by reference.

The printable film of the graphic film construction comprises a thin, conformable polymeric film. In one embodiment, the film has a thickness of less than about 3 mils, or less than about 2.5 mils, or within the range of about 1.0 to about 2.5 mils. In one embodiment, the thickness of the printable film is within the range of about 1.5 to about 2.0 mils. The printable film may be transparent, translucent or opaque.

While not wishing to be bound by any particular theory related to the cracking (fracture) or its measurement, the tensile strength of the printable film, in one embodiment is within the range of about 0.01 to 4 psi, or about 1.5. In one embodiment, the elongation of the printable film is about less than 15%. The Young's modulus of the printable film, in one embodiment is less than about 40,000 psi, or within the range of about 100 to 40,000 psi, preferably about 24,500 psi.

The printable film, in one embodiment, is formed from a polymeric coating composition comprising a blend of cellulose acetate butyrate (CAB) and sucrose acetate isobutyrate. An example of a useful CAB is CAB 553-0.4, which has a hydroxyl content of about 4.8% and is commercially available from Eastman Chemical Company. An example of a useful sucrose acetate isobutyrate is SAIB-100 commercially available from Eastman Chemical Company. The ratio of CAB to SAIB in the blend is within the range of about 7:1 to about 3:1, or within the range of about 6:1 to about 5:1. In one embodiment, the polymeric coating composition consists essentially of a blend of CAB and SAIB and pigment in a solvent. In one embodiment, the polymeric coating composition does not contain any acrylic polymers.

The CAB and SAIB may be added to one or more polar solvents to form a coating composition. Examples of suitable solvents include ethanol, methanol, n-propanol, isopropanol, n-butanol, formic acid, acetic acid, propylene glycol and diacetone alcohol.

Pigments may be added to the composition to increase the opacity and/or modify the porosity of the coated film. In one embodiment, white pigment is added to the composition. Other additives such as waxes, defoamers, antioxidants, UV stabilizers, etc. may be included in the composition to obtain a certain desired characteristic. In one embodiment, a plasticizer is added to the film composition.

A description of useful pressure sensitive adhesives may be found in Encyclopedia of Polymer Science and Engineering, Vol. 13, Wiley-Interscience Publishers (New York, 1988). Additional description of useful PSAs may be found in Polymer Science and Technology, Vol. 1, Interscience Publishers (New York, 1964). Conventional PSAs, including acrylic-based PSAs, rubber-based PSAs and silicone-based PSAs are useful. The PSA may be a solvent based or may be a water based adhesive. In one embodiment, the PSA comprises an acrylic emulsion adhesive.

In one embodiment, the adhesive may be formed from an acrylic based polymer. It is contemplated that any acrylic based polymer capable of forming an adhesive layer with sufficient tack to adhere to a substrate may function in the present invention. In certain embodiments, the acrylic polymers for the pressure-sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure-sensitive adhesive might be formed from a single polymeric species.

The glass transition temperature of a PSA layer comprising acrylic polymers can be varied by adjusting the amount of polar, or "hard monomers", in the copolymer, as taught by U.S. Pat. No. 5,264,532, incorporated herein by reference. The greater the percentage by weight of hard monomers is an acrylic copolymer, the higher the glass transition temperature. Hard monomers contemplated useful for the present invention include vinyl esters, carboxylic acids, and methacrylates, in concentrations by weight ranging from about zero to about thirty-five percent by weight of the polymer.

The PSA can be acrylic based such as those taught in U.S. Pat. No. 5,164,444 (acrylic emulsion), U.S. Pat. No. 5,623, 011 (tackified acrylic emulsion) and U.S. Pat. No. 6,306, 982. The adhesive can also be rubber-based such as those taught in U.S. Pat. No. 5,705,551 (rubber hot melt). It can also be radiation curable mixture of monomers with initiators and other ingredients such as those taught in U.S. Pat. No. 5,232,958 (UV cured acrylic) and U.S. Pat. No. 5,232, 958 (EB cured). The disclosures of these patents as they relate to acrylic adhesives are hereby incorporated by reference.

Another useful acrylic PSA comprises a blend of emulsion polymer particles with dispersion tackifier particles as generally described in Example 2 of U.S. Pat. No. 6,306, 982. The polymer is made by emulsion polymerization of 2-ethylhexyl acrylate, vinyl acetate, dioctyl maleate, and acrylic and methacrylic comonomers as described in U.S. Pat. No. 5,164,444 resulting in the latex particle size of about 0.2 microns in weight average diameters and a gel content of about 60%. In one embodiment, the adhesive is an acrylic adhesive commercially available as AE3349 from Avery Dennison.

In addition to the tackifiers, other additives may be included in the PSAs to impart desired properties. For example, plasticizers may be included, and they are known to decrease the glass transition temperature of an adhesive composition containing elastomeric polymers. Antioxidants also may be included on the adhesive compositions. Cutting agents such as waxes and surfactants also may be included in the adhesives. Light stabilizers, heat stabilizers, and UV absorbers also may be included in the adhesive compositions. Ultraviolet absorbers include benzo-triazol derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

The adhesive layer may be a single layer or comprise multiple layers of adhesive. The multiple layers of adhesive may be applied to the printable layer simultaneously using methods known in the art.

The release liners that may be utilized in the graphic article constructions of the present invention can consist of any of a variety of materials known to those of skill in the art to be suitable as release liners. In one embodiment, the release liner comprises a 90# stayflat liner. Other suitable release liners include silicone coated films or polycoated kraft, as are known in the art. Suitable pre-siliconized release liners are available commercially.

The graphic article constructions of the present invention may be produced, in one embodiment, by reverse roll coating the printable film composition onto a backing film such as polymeric film. The polymeric film may be a polyester sheet, for example, a cast polyethylene terephthalate film. The backing film onto which the printable film composition is coated may also be a conventional silicone release liner. The coat weight of the film composition applied to the backing may be within the range of about 60 to about 100 gsm, or in one embodiment, within the range of about 70 to about 85 gsm. Once the printable film composition has dried, the printable film can be laminated to a pressure sensitive adhesive on a removable release liner. Alternatively, an adhesive composition may be coated onto the printable film and cured. The backing layer is removed from the surface of the printable film so that the outer surface of the printable film may be printed. The printable film may be transparent or pigmented so that the printed graphics stand out from the surface of the substrate to which the graphic article is applied.

In another embodiment, the printable film is printed on the surface opposite the surface to which the backing film is adhered. After printing the printable film, an adhesive layer is laminated to or coated onto the printed surface of the printable film such that the printed layer is positioned between the printable film and the adhesive layer. In this embodiment, the printed film is transparent. The adhesive layer may or may not be pigmented. Applying a pigmented adhesive layer to the printed graphics layer may enable the printed graphics to better stand out from the surface of the substrate to which the film is applied.

The printable film in the foregoing examples may also be a film having air egress and repositionable properties such as EZ™ band of products available from Avery Dennison Corporation, Graphic and Reflective Products Division of Painesville, Ohio. In addition, to the foregoing, print may be applied in an inverse fashion to the face material and then using an adhesive transfer system the image is applied.

Additionally, the printable film in the aforementioned embodiments may include an officially licenses symbol, phrase, picture, word or series of words for a variety of organizations and causes such as, but not limited to, corporations, sports teams, or special events for which an official license is utilized such as the multicolored rings for the Olympics.

The end-user may print the graphic film sheet by using design software to create a desired layout consisting of graphics and/or text. The software controls a wide-format printer, such as a large-format inkjet or digital printer. The graphic film assembly may be fed to the printer in the form of a continuous feed roll, or it can be cut into individual sheets. The printable film may be printed by digital press such as an Indigo® available from HP, Palo Alto, Calif., and other digital print technologies, as well as other inkjet, toner based or screen print technologies and other conventional printing methods.

The printed graphic film assembly can be applied to a broad range of substrates, including, for example, cement or asphalt pavement, brick, cobblestone, stone, ceramic tiles or other surfaces having tactile elements. The surfaces to which the film is applied may be horizontal, angled or vertical surfaces.

To apply the printed assembly, the user removes the release liner, positions the assembly in the desired location and adheres at least a portion of the sheet to a substrate, smoothing the sheet with, for example, a squeegee from the top center downward and outward using short overlapping strokes to prevent wrinkling of the film. A heat source such as a heat gun can be used around the perimeter to secure the edges of the film to the substrate.

The printed graphic film constructions may be used in a wide variety of applications. Specific examples include temporary advertising or signage, such as point of purchase advertising, billboards, banners and temporary decorations.

EXAMPLES

The following examples are intended only to illustrate methods and embodiments in accordance with the invention, and as such should not be construed as imposing limitations upon the claims.

Example 1

Preparation of Printable Film

A film composition is prepared by combining 56 parts by weight of ethyl alcohol and 18 parts by weight diacetone alcohol, and slowly adding 22 parts by weight cellulose acetate butyrate (CAB 553-0.4 from Eastman Chemical) to the solvent blend. To this mixture, 4 parts by weight sucrose acetate isobutyrate (SAIB-100 from Eastman Chemical) is added. Pigment (titanium dioxide) is added to the resin/alcohol blend in an amount of 28 parts by weight pigment to 72 parts by weight resin/alcohol blend.

TABLE 1

|  | Parts by Wt | Parts by Wt |
| --- | --- | --- |
| Film Composition |  | 72 |
| CAB 553-0.4 | 22 |  |
| Ethyl alcohol SDA-3C | 56 |  |
| Diacetone alcohol | 18 |  |
| SAIB-100 | 4 |  |
| Pigment |  |  |
| R-960 + G59 |  | 28 |

Example 2

Preparation of Printable Film

A printable film composition is prepared substantially in accordance with Example 1, with the exception that pigment is added to the resin/alcohol blend in an amount of 34 parts by weight pigment to 66 parts by weight resin/alcohol blend.

Example 3

Preparation of Printable Film

A printable film composition is prepared substantially in accordance with Example 1, with the exception that no pigment is added to the resin/alcohol blend to produce a transparent top coat.

Example 4

Preparation of Adhesive Article

The printable film composition of Example 1 is coated at a coat weight of about 58 gsm onto a 1.42 mil satin PET film and dried at a temperature of 150-210 F to produce a 2.0 mil film. Coated onto the film is a 45 gsm layer of acrylic emulsion adhesive that is dried to form the adhesive layer. A 90# staflat release liner is then adhered to the adhesive layer.

It will thus be seen according to the present invention a highly advantageous temporary outdoor graphic film has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed:
1. A temporary graphic film assembly, comprising:
a printable polymeric layer comprising a printed image or graphic and having a first surface and a second surface and having a thickness of less than 3 mils, wherein the printable polymeric layer comprises a polymeric coat- ing composition comprising a blend of fracturable material configured to fracture over contours in an irregular surface, wherein the blend includes a ratio of cellulose acetate butyrate and sucrose acetate isobutyrate within the range of about 7:1 to about 3:1, wherein the polymeric coating composition does not contain any acrylic polymers;

a reflective layer disposed beneath the printable layer;

a layer of pressure sensitive adhesive having a first and second surface, the first surface of the adhesive layer adhered to the reflective layer;

wherein the graphic film assembly is conformable to surfaces having a roughness average Ra of at least 25 microns, and wherein the pressure sensitive adhesive layer includes an acrylic emulsion adhesive.

2. The graphic film assembly of claim 1 wherein the reflective layer includes retroreflective beads.

3. The graphic film assembly of claim 2, wherein the retroreflective beads have an average diameter in a range from 25 to 300 microns.

4. The graphic film assembly of claim 2, wherein the retroreflective beads have an index of refraction in the range of 1.9-2.3.

5. The graphic film assembly of claim 1, wherein the reflective layer is a prismatic layer.

6. The graphic film assembly of claim 1, wherein the printable polymeric layer is clear, transparent, opaque, or pigmented.

7. The graphic film assembly of claim 1, wherein the printable layer further includes an identifier selected from the group consisting of a symbol, phrase, picture, word, or series of words of a corporation.

8. A temporary graphic film assembly, comprising:

a printable polymeric layer having a first surface and a second surface and having a thickness of less than 3 mils, the printable polymeric layer comprising a polymeric coating composition comprising a blend of fracturable material configured to fracture over contours in an irregular surface, wherein the blend includes a ratio of cellulose acetate butyrate and sucrose acetate isobutyrate within the range of about 7:1 to about 3:1, wherein the polymeric coating composition does not contain any acrylic polymers;

an adhesive layer of pressure sensitive adhesive, wherein the adhesive layer comprises a reflective material;

wherein the graphic film assembly is conformable to surfaces having a roughness average Ra of at least 25 microns.

9. The graphic film assembly of claim 8, wherein the pressure sensitive adhesive is an acrylic emulsion adhesive.

* * * * *